(12) United States Patent
Kusumoto

(10) Patent No.: US 9,007,654 B2
(45) Date of Patent: Apr. 14, 2015

(54) IMAGE FORMING APPARATUS

(71) Applicant: Kyocera Document Solutions Inc., Osaka (JP)

(72) Inventor: Koji Kusumoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/068,110

(22) Filed: Oct. 31, 2013

(65) Prior Publication Data

US 2014/0118795 A1    May 1, 2014

(30) Foreign Application Priority Data

Oct. 31, 2012  (JP) ................... 2012-240053

(51) Int. Cl.
*H04N 1/00* (2006.01)
*H04N 1/21* (2006.01)
*G11B 19/04* (2006.01)

(52) U.S. Cl.
CPC ....... *H04N 1/00018* (2013.01); *H04N 1/00037* (2013.01); *H04N 1/00053* (2013.01); *H04N 1/00063* (2013.01); *H04N 1/2166* (2013.01); *H04N 2201/3287* (2013.01); *H04N 1/00007* (2013.01); *H04N 1/00042* (2013.01); *H04N 1/0005* (2013.01); *H04N 1/00082* (2013.01); *H04N 1/00912* (2013.01); *H04N 2201/216* (2013.01); *H04N 2201/0091* (2013.01); *G11B 19/042* (2013.01); *G11B 2220/45* (2013.01)

(58) Field of Classification Search
None
See application file for complete search history.

(56) References Cited

U.S. PATENT DOCUMENTS

| | | | | |
|---|---|---|---|---|
| 2006/0153588 | A1* | 7/2006 | Sakai et al. | 399/110 |
| 2007/0067683 | A1* | 3/2007 | Yamanaka | 714/100 |
| 2010/0313076 | A1* | 12/2010 | Wei et al. | 714/42 |
| 2011/0122456 | A1* | 5/2011 | Ishii et al. | 358/448 |
| 2012/0268789 | A1* | 10/2012 | Yamada | 358/1.16 |

FOREIGN PATENT DOCUMENTS

| | | |
|---|---|---|
| JP | 08-065474 | 3/1996 |
| JP | 2008-018575 | 1/2008 |
| JP | 2008-300920 | 12/2008 |
| JP | 2010061716 A * | 3/2010 |

OTHER PUBLICATIONS

European Search Report—Application No. 13191159.6, dated Feb. 3, 2014. (6 pages).

* cited by examiner

*Primary Examiner* — Kimberly A Williams
(74) *Attorney, Agent, or Firm* — K&L Gates LLP

(57) ABSTRACT

An image forming apparatus includes an image reading portion, an image processing portion, a storage portion, a storage selector portion, an image forming portion, and a control portion. The storage portion includes a first storage portion and a second storage portion with greater vibration resistance than the first storage portion, and stores image data scanned by the image reading portion and processed by the image processing portion. The storage selector portion selects one of the first storage portion and the second storage portion based on the strength of mechanical vibrations during an operation of the apparatus, and a data size of the image data. The control portion causes the image data to be stored in the storage portion selected by the storage selector portion, and controls the image forming portion to read the stored image data and form an image.

12 Claims, 3 Drawing Sheets

| PROCESSING OPERATION | THRESHOLD SIZE |
|---|---|
| SIMPLEX TO SIMPLEX | 9 |
| DUPLEX TO SIMPLEX | 8 |
| SIMPLEX TO DUPLEX | 6 |
| DUPLEX TO DUPLEX | 5 |

FIG.2

IMAGE FORMING APPARATUS

INCORPORATION BY REFERENCE

This application is based upon, and claims the benefit of priority from the corresponding Japanese Patent Application No. 2012-240053, filed in the Japan Patent Office on Oct. 31, 2012, the entire contents of which are incorporated herein by reference.

BACKGROUND

The present disclosure relates to an image forming apparatus such as a photocopier or multi-function peripheral that scans a document image, and forms images based on the scanned image data.

An image forming apparatus such as a photocopier or multi-function device is configured to scan a document image, compress and temporarily store scanned image data in a storage portion, and form an image based on the image data stored in the storage portion.

The storage device that temporarily stores compressed image data may be a hard disk drive (HDD) using a magnetic disk or a solid-state drive (SSD) using semiconductor memory.

However, HDDs, being structured to write data to an internal magnetic device using a head, have low vibration resistance. Consequently, when using an HDD as the storage portion that temporarily stores image data, vibration can cause write errors in the image data, which lowers the data transfer speed. Thus, there is a risk that a required data speed (transfer rate) may not be satisfied due to mechanical vibrations during copy operations (vibrations produced by the revolution of the motor, the feeding of documents or copy sheets, and the like).

In contrast, SSDs are highly vibration resistant as compared to HDDs. Consequently, when using an SSD as the storage portion that temporarily stores image data, vibration does not result in a lowered data transfer rate. However, since SSDs have a higher cost-per-bit of data compared to HDDs, and since there is a limit on the number of available rewrites, SSDs lead to higher apparatus costs and running costs.

SUMMARY

An image forming apparatus according to an embodiment of the present disclosure includes a document reading portion, an image processing portion, a storage portion, a storage selector portion, a image forming portion, and a control portion. The document reading portion scans a document image and generates image data. The image processing portion processes image data generated by the document reading portion. The storage portion includes a first storage portion with low vibration resistance whose data transfer speed is reduced due to vibrations, and a second storage portion with greater vibration resistance than the first storage portion, and stores the image data processed by the image processing portion. The storage selector portion selects one of the first storage portion and the second storage portion as a storage location of the processed image data, based on the strength of mechanical vibrations during an operation of the image forming apparatus, and a data size of the processed image data. The image forming portion forms an image based on the image data stored in the storage portion. The control portion causes the image data processed by the image processing portion to be stored in one of the first storage portion and the second storage portion selected by the storage selector portion, and in addition, controls the image forming portion to read the image data from one of the first storage portion and the second storage portion storing the image data, and form an image.

Additional features and advantages are described herein, and will be apparent from the following Detailed Description and the figures.

BRIEF DESCRIPTION OF THE FIGURES

FIG. 2 is a diagram illustrating threshold size information stored in the storage selector illustrated in FIG. 1.

DETAILED DESCRIPTION

An image forming apparatus according to an embodiment of the present disclosure will be described with reference to the drawings.

Figure 1:
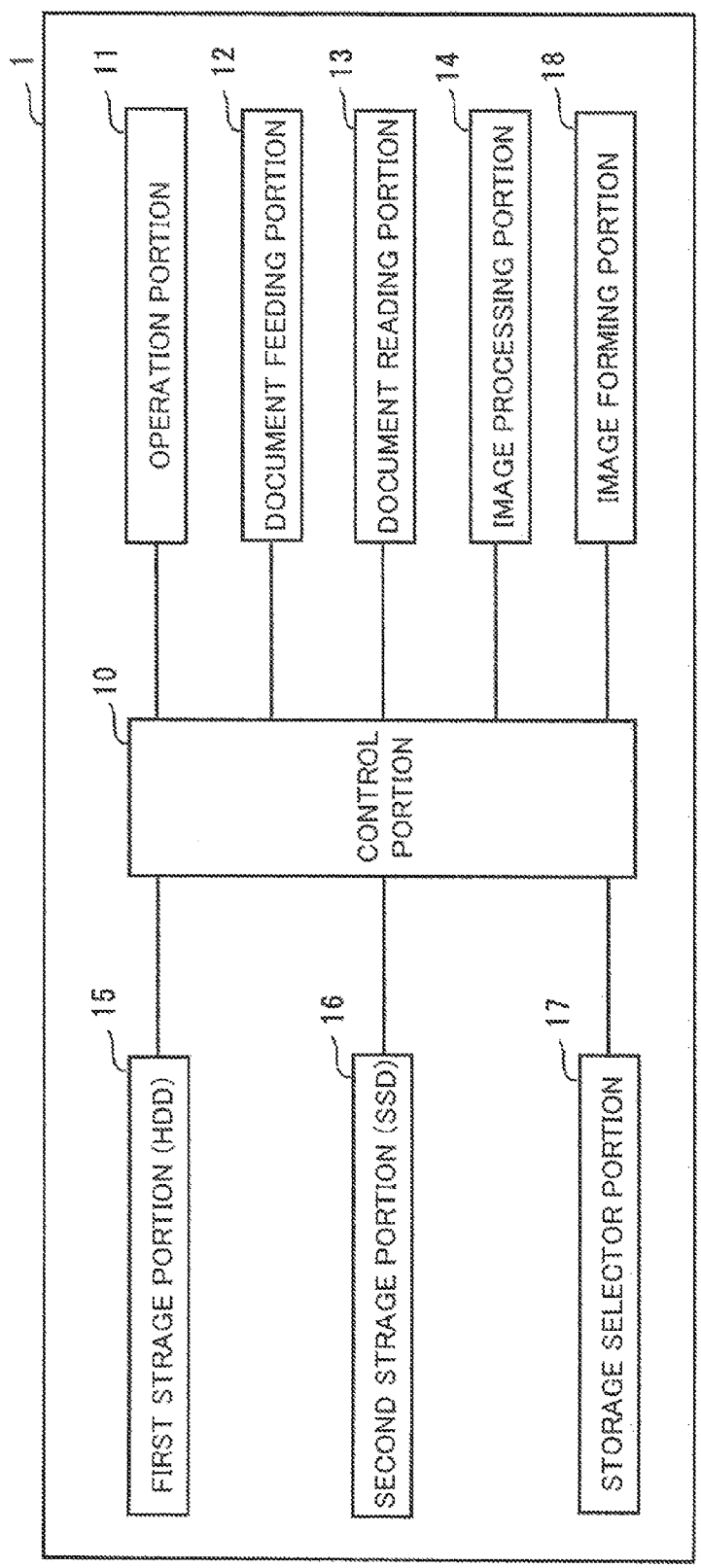
FIG. 1 is a block diagram illustrating a schematic configuration of an image forming apparatus according to an embodiment of the present disclosure.

An image forming apparatus 1 according to an embodiment of the present disclosure is a photocopier. Referring to FIG. 1, the image forming apparatus 1 includes a control portion 10, an operation portion 11, an document feeding portion 12, a document reading portion 13, an image processing portion 14, a first storage portion 15, a second storage portion 16, a storage selector portion 17, and a image forming portion 18.

The control portion 10 is an information processor such as a microcontroller equipped with read-only memory (ROM), random access memory (RAM), and the like. A control program for operational control of the image forming apparatus 1 is stored in the ROM. The control portion 10, by reading the control program stored in the ROM and loading the control program into the RAM, controls the overall apparatus according to designated instruction information inputted from the operation portion 11.

The operation portion 11 is a user interface which includes various operating keys, such as a touch panel provided with a transparent pressure sensor on the surface of a liquid crystal display panel and on which various operating settings are applied, a keypad for inputting numerical values such as the number of copies to print, a reset key for inputting instructions to reset the settings information, a stop key for stopping copy operations or cancelling an inputted numerical value, an interrupt key that issues instructions for an interrupt copy, and a start key for inputting output instructions that cause copy operations to start.

The document feeding portion 12 successively feeds a document placed in a document receptacle (not illustrated) into the document reading portion 13 one sheet at a time. The document feeding portion 12 also, in the case where the processing operation for scanning a document is set to duplex scanning by the operation portion 11, reverses and feeds a document having one side already scanned by the document reading portion 13 back into the document reading portion 13, thereby causing the document reading portion 13 to scan the opposite side of the document.

The document reading portion 13 scans a document image line-by-line by radiating light onto a document fed by the document feeding portion 12, or a document placed onto platen glass by a user, and sensing the light reflected off the document with a line sensor.

The image processing portion 14 performs an image detecting process such as a density or color/monochrome distinguishing process, an enlarging/reducing process, a filtering process, a binarizing process, or the like on image data scanned by the document reading portion 13, compresses (such as with JPEG) the processed image data, and outputs compressed image data to the first storage portion 15 or the second storage portion 16. Also, the image processing portion 14 detects the size of the compressed image data, and outputs the size of the compressed image data to the storage selector 17.

The first storage portion 15 is a hard disk drive (HDD) that stores information on a disc-shaped storage medium. Meanwhile, the second storage portion 16 is a solid-state drive (SSD) using semiconductor memory. Image data that has been scanned by the document reading portion 13 and processed by the image processing portion 14 is temporarily stored in one of the two storage devices (the first storage portion 15 and the second storage portion 16), and then outputted to the image forming portion 18. The first storage portion 15 is configured to have low vibration resistance compared to the second storage portion 16, and if subjected to vibration, the data transfer speed is reduced. Meanwhile, the second storage portion 16 is configured to have high vibration resistance compared to the first storage portion 15, and the data transfer speed is not reduced even if subjected to vibration. On the other hand, the second storage portion 16 has a higher cost-per-bit of data compared to the first storage portion 15, and there is a limit on the number of available rewrites.

Threshold size information, such as that illustrated in FIG. 2, is stored in advance in the storage selector portion 17. In the threshold size information, a data size (threshold size) of image data is set for each of multiple processing operations. The multiple processing operations are categorized according to the strength of mechanical vibrations during copy operations (vibrations produced by revolutions of a motor, the transporting of documents or copy sheets, and the like). A copy operation to be executed corresponds to one of the processing operations. As illustrated in FIG. 2, in an embodiment, four types of processing operations ("simplex to simplex", "duplex to simplex", "simplex to duplex", and "duplex to duplex") are set according to whether document scanning is simplex or duplex and whether image formation on a copy sheet is simplex or duplex. Herein, "simplex to simplex" refers to a processing operation that scans one side of a document and forms an image on one side of a copy sheet. "Duplex to simplex" refers to a processing operation that scans both sides of a document and forms an image on one side of a copy sheet. "Simplex to duplex" refers to a processing operation that scans one side of a document and forms an image on both sides of a copy sheet. "Duplex to duplex" refers to a processing operation that scans both sides of a document and forms an image on both sides of a copy sheet. In addition, the strength of the mechanical vibrations relates to "simplex to simplex"<"duplex to simplex"<"simplex to duplex"<"duplex to duplex", according to factors such as the number of processing functions in the image forming apparatus 1 that are used by each of the processing operations. In other words, "simplex to simplex" has the least amount of mechanical vibrations, whereas "duplex to duplex" has the greatest amount of mechanical vibrations.

Data transfer speeds of the first storage portion 15 during each processing operation are measured in advance, and threshold sizes are set to data sizes for which the processing speed of the image forming apparatus 1 (the printing speed per unit time) may be maintained, even at the measured data transfer speeds.

For example, when the processing speed of the image forming apparatus 1 is 50 pages per minute, a copy of one page must be output within 1.2 seconds. Consequently, when the data transfer speed of the first storage portion 15 is 8 MB/s during the "simplex to simplex" processing operation, the image forming apparatus 1 is unable to maintain the processing speed unless the data size for one page of image data is 9.6 MB or less. Accordingly, in the threshold size information, the threshold size corresponding to the "simplex to simplex" processing operation is given a margin of error and set to 9 MB, which is less than 9.6 MB.

Similarly, when the data transfer speed of the first storage portion 15 drops to 7 MB/s due to vibration during the "duplex to simplex" processing operation, the data size of image data needs to be 8.4 MB or less. Accordingly, in the threshold size information, the threshold size corresponding to the "duplex to simplex" processing operation is given a margin of error and set to 8 MB, which is less than 8.4 MB.

Also, when the data transfer speed of the first storage portion 15 drops further to 5.5 MB/s due to vibration during the "simplex to duplex" processing operation, the data size of image data needs to be 6.6 MB or less. Accordingly, in the threshold size information, the threshold size corresponding to the "simplex to duplex" processing operation is given a margin of error and set to 6 MB, which is less than 6.6 MB.

Furthermore, when the data transfer speed of the first storage portion 15 drops further to 4.5 MB/s due to vibration during the "duplex to duplex" processing operation, the data size of image data needs to be 5.4 MB or less. Accordingly, in the threshold size information, the threshold size corresponding to the "duplex to duplex" processing operation is given a margin of error and set to 5 MB, which is less than 5.4 MB.

Note that the categorization of processing operations in the threshold size information are merely one example, and may be appropriately set depending on the factors that produce vibrations.

In addition, the storage selector portion 17 specifies, based on the threshold size information, a threshold size corresponding to a processing operation set by the operation portion 11. Subsequently, by comparing the specified threshold size to the data size for one page of image data processed by the image processing portion 14, the storage selector portion 17 selects one of the two types of storage devices (the first storage portion 15 and the second storage portion 16).

The image forming portion 18 forms an image and prints onto a copy sheet using electrophotography technology, for example. The image forming portion 18 forms a latent image on the surface of a photoconductive drum based on the image data read from the first storage portion 15 or the second storage portion 16, form the latent image as a toner image with toner from a developer device, transfer the toner image from the photoconductive drum onto a copy sheet, fuse the toner image to the copy sheet, and discharge the copy sheet to a discharge tray. Also, the image forming portion 18, in the case where the processing operation for printing onto a copy sheet is set to duplex printing by the operation portion 11, reverses a copy sheet having one side already printed, and additionally prints on the opposite side of the copy sheet.

Figure 3:
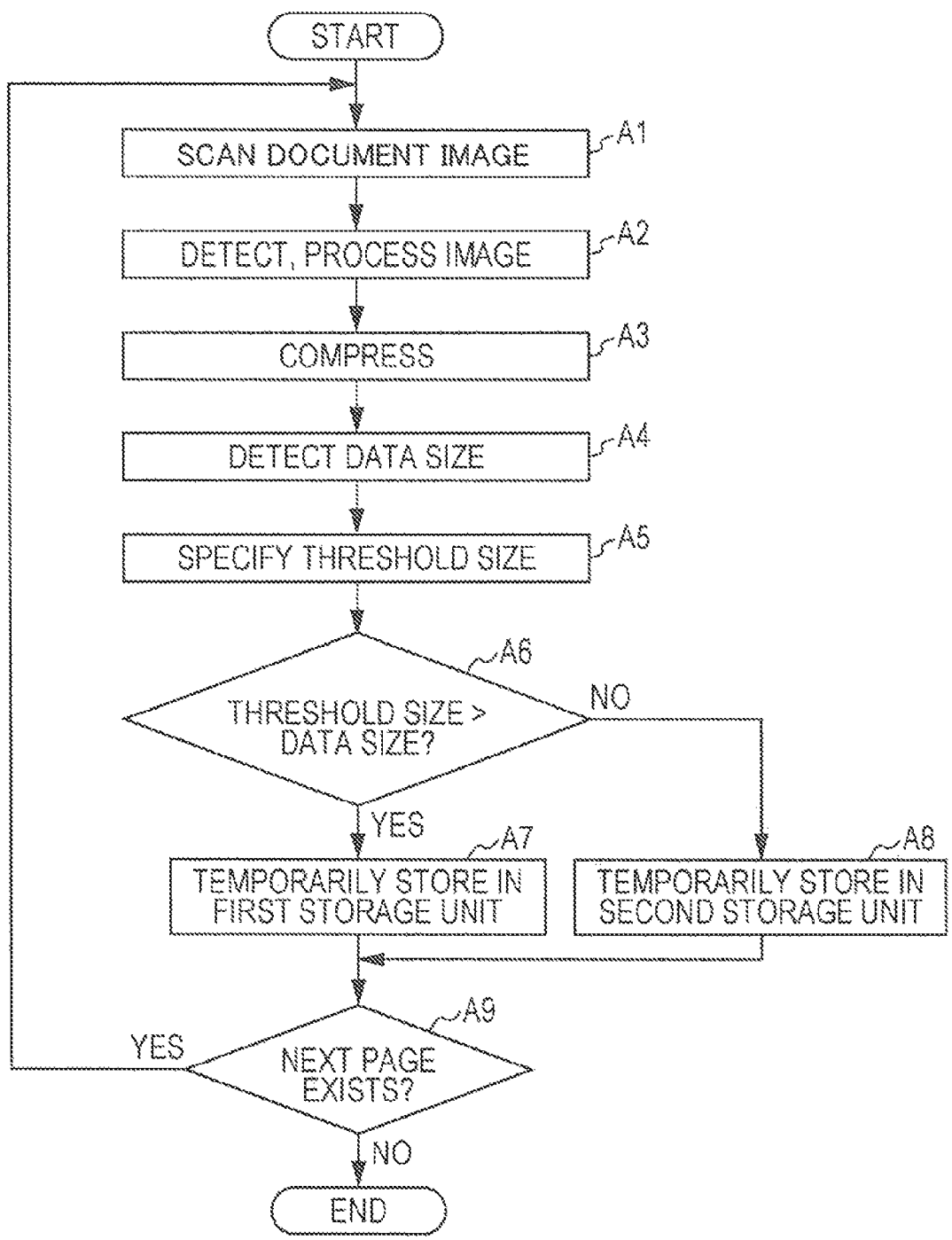
FIG. 3 is a flowchart for explaining copy operations of an image forming apparatus according to an embodiment of the present disclosure.

Next, copy operations of an embodiment will be described in detail with reference to FIG. 3.

In the operation portion 11, if instructions for a copy operation are given by pressing the start key after setting a processing operation, the control portion 10 instructs the document reading portion 13 to scan one page of a document. The document reading portion 13 scans a document image line-by-line (step A1), and outputs the one page of scanned image data to the image processing portion 14.

Next, the image processing portion 14 performs an image detecting process and image processing (step A2), as well as a compression process (step A3) on the image data scanned by the document reading portion 13. Also, the image processing portion 14 detects the data size of one page of the compressed image data (step A4), and outputs the data size of one page of the compressed image data to the storage selector portion 17.

Next, the storage selector portion 17 specifies, based on the stored threshold size information, a threshold size corresponding to the processing operation set by the operation portion 11 (step A5). In addition, the storage selector portion 17 determines whether or not the data size detected in step A4 is less than the threshold size specified in step A5 (step A6).

In step A6, when the data size detected in step A4 is less than the threshold size specified in step A5, it is determined that the data transfer speed of the first storage portion 15 is able to maintain the processing speed of the image forming apparatus 1. As a result, the storage selector portion 17 selects the first storage portion 15 as the temporary storage location of the image data compressed in step A3, and the control portion 10 causes the first storage portion 15 to store the image data compressed in step A3 (step A7). The control portion 10 reads the image data temporarily stored in the first storage portion 15 at arbitrary timings, and forms an image with the image forming portion 18.

On the other hand, in step A6, when the data size detected in step A4 is not less than the threshold size specified in step A5, it is determined that the data transfer speed of the first storage portion 15 is unable to maintain the processing speed of the image forming apparatus 1. As a result, the storage selector portion 17 selects the second storage portion 16 as the temporary storage location of the image data compressed in step A3, and the control portion 10 causes the second storage portion 16 to store the image data compressed in step A3 (step A8). The control portion 10 reads the image data temporarily stored in the second storage portion 16 at arbitrary timings, and forms an image with the image forming portion 18.

Next, the control portion 10 determines whether or not a subsequent page exists, using a document detecting sensor (not illustrated) or the like (step A9). When a subsequent page exists in step A9, the control portion 10 returns to step A1 and instructs the document reading portion 13 to scan the next page of the document. Meanwhile, when a subsequent page does not exist in step A9, the control portion 10 ends the copy operation.

Note that although in an embodiment the disclosure is configured to select either the first storage portion 15 or the second storage portion 16 as a temporary storage location for image data on a per-page basis, an embodiment may also be configured such that a page is divided into bands by taking successive groups of multiple lines (every 250 lines, for example) in the sub-scan direction as individual bands, and selecting the first storage portion 15 or the second storage portion 16 as a temporary storage location for image data on a per-band basis. In this case, image processing and an image compression process is conducted on a per-band basis, and in addition, threshold sizes corresponding to processing operations are set in correspondence with band sizes.

As described above, in an embodiment the disclosure includes: a first storage portion 15 with low vibration resistance whose data transfer speed is reduced due to vibrations; a second storage portion 16 with higher vibration resistance than the first storage portion 15 and also a higher cost-per-bit than the first storage portion 15; and a storage selector portion 17 that selects one of the first storage portion 15 and the second storage portion 16 as a temporary storage location of compressed image data, based on the strength of the mechanical vibrations during a copy operation, and the data size of the compressed image data. Thus, the first storage portion 15 may be selected as a temporary storage location when it is determined that the data transfer speed of the first storage portion 15 is able to maintain the processing speed of the image forming apparatus even if the data transfer speed of the first storage portion 15 is reduced due to the strength of mechanical vibrations, while the second storage portion 16 may be selected as a temporary storage location when it is determined that the data transfer speed of the first storage portion 15 is unable to maintain the processing speed of the image forming apparatus. For this reason, selectively using two types of storage devices provides the advantageous effect of maintaining the processing speed of the image forming apparatus while keeping the cost-per-bit low, irrespective of mechanical vibrations produced during copy operations.

Furthermore, according to an embodiment, the storage selector portion 17 is configured to specify a threshold size corresponding to a set processing operation based on the threshold size information in which a threshold size is set for each of multiple processing operations categorized according to the strength of mechanical vibrations during a copy operation. Then, the storage selector portion 17 is configured to select either the first storage portion 15 or the second storage portion 16 by comparing the specified threshold size to the data size of compressed image data. Thus, it is possible to select either the first storage portion 15 or the second storage portion 16 based on the threshold size specified according to a processing operation setting without directly detecting the strength of mechanical vibrations, thereby eliminating the need to provide extra sensors.

It should be clear that the present disclosure is not limited to the foregoing embodiments, and may be modified as appropriate within the scope of the technical ideas of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming apparatus comprising:
an image reading portion that scans a document image and generates image data;
an image processing portion that processes image data generated by the image reading portion;
a storage portion including a first storage portion with low vibration resistance whose data transfer speed is reduced due to vibrations, and a second storage portion with higher vibration resistance than the first storage portion, that stores the image data processed by the image processing portion;
a storage selector portion that selects one of the first storage portion and the second storage portion as a storage location of the processed image data, based on the strength of mechanical vibrations during an operation of the image forming apparatus, and a data size of the processed image data;
an image forming portion that forms an image based on the image data stored in the storage portion; and a control portion that causes the image data processed by the image processing portion to be stored in one of the first storage portion and the second storage portion selected by the storage selector portion, and in addition, controls the image forming portion to read the image data from one of the first storage portion and the second storage portion storing the image data, and form an image, wherein the storage selector portion specifies a threshold size corresponding to a set processing operation based on threshold size information in which a threshold size is set for each of a plurality of processing operations categorized according to a strength of mechanical vibrations during an image forming operation, and selects one of the first storage portion and the second storage portion by comparing the specified threshold size to a data size of the processed image data.

2. The image forming apparatus according to claim 1, wherein the storage selector portion selects the first storage portion when the data size of the image data is less than the threshold size, and selects the second storage portion when the data size of the image data is not less than the threshold size.

3. The image forming apparatus according to claim 1, wherein the processing operations include a processing operation that scans one side of a document and forms an image on one side of a sheet, a processing operation that scans both sides of a document and forms an image on one side of a sheet, a processing operation that scans one side of a document and forms an image on both sides of a sheet, and a processing operation that scans both sides of a document and forms an image on both sides of a sheet.

4. The image forming apparatus according to claim 1, wherein the strength of mechanical vibrations increases in the order of: a processing operation that scans one side of a document and forms an image on one side of a sheet; a processing operation that scans both sides of a document and forms an image on one side of a sheet; a processing operation that scans one side of a document and forms an image on both sides of a sheet; and a processing operation that scans both sides of a document and forms an image on both sides of a sheet.

5. The image forming apparatus according to claim 1, wherein the threshold size for each processing operation is set less in the order of: a processing operation that scans one side of a document and forms an image on one side of a sheet; a processing operation that scans both sides of a document and forms an image on one side of a sheet; a processing operation that scans one side of a document and forms an image on both sides of a sheet; and a processing operation that scans both sides of a document and forms an image on both sides of a sheet.

6. The image forming apparatus according to claim 1, further comprising:

an operation portion that inputs various operating instruction information; and wherein the processing operation is inputted from the operation portion.

7. The image forming apparatus according to claim 1, wherein the storage selector portion selects one of the first storage portion and the second storage portion as a storage location of image data per one page of image data of the document image.

8. The image forming apparatus according to claim 1, wherein the storage selector portion selects one of the first storage portion and the second storage portion as a storage location of image data per designated lines of the image data.

9. The image forming apparatus according to claim 1, wherein the image processing portion performs a compression process on image data generated by the image reading portion.

10. The image forming apparatus according to claim 1, wherein the first storage portion is a hard disk drive, and the second storage portion is a solid-state drive using semiconductor memory.

11. An image forming apparatus comprising:

an image reading portion that scans a document image and generates image data;

an image processing portion that processes image data generated by the image reading portion;

a storage portion including a first storage portion with low vibration resistance whose data transfer speed is reduced due to vibrations, and a second storage portion with higher vibration resistance than the first storage portion, that stores the image data processed by the image processing portion;

a storage selector portion that selects one of the first storage portion and the second storage portion as a storage location of the processed image data, based on the strength of mechanical vibrations during an operation of the image forming apparatus, and a data size of the processed image data;

an image forming portion that forms an image based on the image data stored in the storage portion; and a control portion that causes the image data processed by the image processing portion to be stored in one of the first storage portion and the second storage portion selected by the storage selector portion, and in addition, controls the image forming portion to read the image data from one of the first storage portion and the second storage portion storing the image data, and form an image, wherein the storage selector portion selects one of the first storage portion and the second storage portion as a storage location of image data per one page of image data of the document image.

12. An image forming apparatus comprising:

an image reading portion that scans a document image and generates image data;

an image processing portion that processes image data generated by the image reading portion;

a storage portion including a first storage portion with low vibration resistance whose data transfer speed is reduced due to vibrations, and a second storage portion with higher vibration resistance than the first storage portion, that stores the image data processed by the image processing portion;

a storage selector portion that selects one of the first storage portion and the second storage portion as a storage location of the processed image data, based on the strength of mechanical vibrations during an operation of the image forming apparatus, and a data size of the processed image data;

an image forming portion that forms an image based on the image data stored in the storage portion; and a control portion that causes the image data processed by the image processing portion to be stored in one of the first storage portion and the second storage portion selected by the storage selector portion, and in addition, controls the image forming portion to read the image data from one of the first storage portion and the second storage portion storing the image data, and form an image, wherein the storage selector portion selects one of the first storage portion and the second storage portion as a storage location of image data per designated lines of the image data.

* * * * *